United States Patent
Eberlein (10) Patent No.: US 12,015,680 B1
(45) Date of Patent: Jun. 18, 2024

(54) USER DEMAND-SPECIFIC SERVICE MESH ASSEMBLY OF MULTI-TENANT, SINGLE-TENANT, AND EXTENSION SERVICES

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/298,661

(22) Filed: Apr. 11, 2023

(51) Int. Cl.
*H04L 67/51* (2022.01)
*H04L 67/10* (2022.01)
*H04L 67/30* (2022.01)

(52) U.S. Cl.
CPC .............. *H04L 67/51* (2022.05); *H04L 67/10* (2013.01); *H04L 67/30* (2013.01)

(58) Field of Classification Search
CPC .......... H04L 67/51; H04L 67/10; H04L 67/30
See application file for complete search history.

(56) References Cited

U.S. PATENT DOCUMENTS

| | | | |
|---|---|---|---|
| 11,119,883 B1 | 9/2021 | Eberlein et al. | |
| 11,121,943 B2 | 9/2021 | Eberlein et al. | |
| 11,418,550 B1 | 8/2022 | Eberlein et al. | |
| 11,457,080 B1 * | 9/2022 | Meduri | H04L 67/60 |
| 11,522,948 B1 * | 12/2022 | Kairali | H04L 67/1012 |
| 2008/0162490 A1 * | 7/2008 | Becker | G06F 16/27 |
| 2014/0156724 A1 * | 6/2014 | Said | H04L 65/40 |
| | | | 709/203 |
| 2018/0083967 A1 * | 3/2018 | Subramanian | H04L 63/10 |
| 2019/0220529 A1 * | 7/2019 | Eberlein | G06F 16/211 |
| 2021/0019194 A1 * | 1/2021 | Bahl | H04L 67/1031 |
| 2021/0182251 A1 | 6/2021 | Eberlein et al. | |
| 2023/0291677 A1 * | 9/2023 | Trakinat | H04W 40/02 |

OTHER PUBLICATIONS

U.S. Appl. No. 17/875,690, Ni, filed Jul. 28, 2022.
Istio.io [online], "Virtual Service" Aug. 2020, retrieved on Apr. 11, 2023, retrieved from URL <https://istio.io/latest/docs/reference/config/networking/virtual-service/>, 37 pages.
Extended European Search Report in European Appln. No. 23193849.9, mailed on Feb. 5, 2024, 13 pages.

* cited by examiner

*Primary Examiner* — Tonia L Dollinger
*Assistant Examiner* — Mehulkumar J Shah
(74) *Attorney, Agent, or Firm* — Fish & Richardson P.C.

(57) ABSTRACT

In an implementation, a mesh assembler receives a request for a new cloud-computing application tenant, where the request includes an assembly profile. The mesh assembler calls a deployment manager for applications and services that need to be custom deployed according to the assembly profile. The mesh assembler calls a routing configurator, which looks up services with certain attributes and configures services with certain attributes into a service mesh.

20 Claims, 3 Drawing Sheets

USER DEMAND-SPECIFIC SERVICE MESH ASSEMBLY OF MULTI-TENANT, SINGLE-TENANT, AND EXTENSION SERVICES

BACKGROUND

In cloud-computing applications, a high-priority goal is to run all services in a multi-tenant fashion in a manner to permit sharing of all costs (for example, resources and operations) as much as possible among the tenants consuming the applications. However, there are limits to this aspiration, because for some scenarios, strict isolation of services per tenant is required. Traditionally, the limits translate into an "all-or-nothing" decision for each service. That is, whether the service should be used in a multi-tenant or a single-tenant deployment in the context of a specific application and at the expense of not exploiting savings potentials for a subset of tenants that could do without their own deployment of some services while the subset of tenants need to be single-tenant for other tenants.

SUMMARY

The present disclosure describes a user demand-specific service mesh assembly.

In an implementation, a computer-implemented method, comprises: receiving, at a mesh assembler, a request for a new cloud-computing application tenant, wherein the request includes an assembly profile; calling, by the mesh assembler, a deployment manager for applications and services that need to be custom deployed according to the assembly profile; and calling, by the mesh assembler, a routing configurator, which looks up services with certain attributes and configures services with certain attributes into a service mesh.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, using the described approach, a number of critical activity (for example, business) scenarios can be addressed that maximize the use of shared multi-tenant application and service deployments to minimize resource and operational costs while enabling controlled breakouts to custom single-tenant deployments as users (for example, customers) demand. Second, the describe approach can reduce redundancy in service deployments for high-availability, disaster recover, and regulatory requirements, by allowing selective sharing. Third, the described approach provides a consistent and elegant solution for integrating customer specific extension services into a service mesh.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes a user demand-specific service mesh assembly, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In cloud-computing applications, a high-priority goal is to run all services in a multi-tenant fashion in a manner to permit sharing of all costs (for example, resources and operations) as much as possible among the tenants consuming the applications. However, there are limits to this aspiration, because for some scenarios, strict isolation of services per tenant is required. Traditionally, the limits translate into an "all-or-nothing" decision for each service. That is, whether the service should be used in a multi-tenant or a single-tenant deployment in the context of a specific application and at the expense of not exploiting savings potentials for a subset of tenants that could do without their own deployment of some services while the subset of tenants need to be single-tenant for other tenants.

Described is an approach providing, for cloud-computing applications following a micro-services architecture pattern in a service mesh. Unlike a monolithic application, a micro-services-based application consists of a number of individual services that run in separate processes and communicate with each other over a network that forms a mesh among these services. A service mesh that supports both multi-tenant and single-tenant usage patterns, a user demand-specific service mesh assembly permitting mixing of multi-tenant and single-tenant services as needed for a variety of scenarios. The described approach also permits user-specific extension services.

There are a number of scenarios that demand user-specific selection of multi-tenant or single-tenant services when assembling an application solution for a user in the cloud:

Scalability Limits of Some Services

A service has an individual scalability limit, and while most services can easily scale to thousands of tenants, some services have lower limits that may depend on a number of tenants or a data volume (size) of these tenants. Therefore, a service can be shared among more or less tenants, potentially also depending on the service's expected size, up to requiring a dedicated deployment for very large tenants.

Customer Managed Keys for Data at Rest

Persistence services typically encrypt their associated data while at rest. While it is sufficient for most users if data of all tenants is encrypted with the same (shared) encryption key, some users demand to be in control of their user-specific encryption key that can be managed independently of other tenants using the same service. Often this requires a dedicated deployment of the persistence service for this use case if encryption keys are bound to the deployment and not individually selectable per tenant.

Isolated Containers for Data in Use

Likewise, most users are not concerned about their data in use being in the same processing memory of a service that is used in a multi-tenant setup. The implementation of the service takes care of isolating each tenant's data so that cross-tenant data access is prevented. However, software bugs or malicious attacks might breach this barrier and exceptionally security-conscious users may request that at least critical services processing sensitive data (for example, business data or health records) are run in a single-tenant setup to ensure tenant isolation on a lower layer. One could isolate data virtually in code (for example, by user tenant specific keys in in-memory data structures), but this bears the risk that by a programming error or an attack, the data of all tenants may become accessible. By putting data in physically isolated buckets on a lower technology layer (for example, using separate processes, each process exclusively dealing with data of one tenant), this risk is eliminated.

High Availability/Disaster-Recovery Requirements

Some users have certain high-availability or disaster-recovery requirements that demand redundant service deployments across multiple availability zones or regions. However, this is not necessarily required for all services that constitute a cloud-computing application. For some services, a choice between a regular and a redundant deployment is needed, while for others a regular deployment does not affect overall high-availability and disaster-recovery capabilities. Users should be provided, and be able to select from, different service assemblies. Therefore, different service assemblies should be available to users to pick from.

Regulatory Requirements

There are many country-specific regulatory requirements when it comes to handling in cloud-computing applications. As a consequence, cloud-computing solutions are usually deployed with all of their dependent services in multiple regions, each fulfilling individual local regulatory requirements. While this type of redundancy is unavoidable for many services, some services that are not affected by the regulatory requirements are unnecessarily replicated. In a multi-tenant setup, these services could be shared among all users, while only relevant services need to be deployed multiple times, although also in a multi-tenant setup to be shared among a subset of customers of the specific region.

User Individual Upgrade Windows

In multi-tenant solutions applications and services are maintained independently of users being served. When an upgrade is due, a service will be replaced with a newer version of the service during a next available upgrade window, no matter if the often associated downtime fits all users' schedules. For some users, this is not acceptable, and they are willing to pay a premium for an ability to control an upgrade schedule of services that they are using. Switching to a single-tenant setup of at least the most critical services is an important capability for them.

User Extension Services

Cloud-computing software is standard software, with no means of modification but restricted to configuration and implementing pre-defined extension points for individualizing functionality. While other solutions exist that enable users to manually integrate their own extension service implementations into a given setup, the describe approach can provide a much more consistent and elegant solution by treating user extension services just like custom single-tenant services that are deployed individually per tenant. With this, users can not only implement pre-defined extension points, adding custom functionality, they can even fully replace standard services, re-enabling modification possibilities even in a cloud-computing environment.

Common to these scenarios is that in neither of the two dimensions of users and services is an all-or-nothing decision the optimum solution: 1) each user may have different reasons to demand some (but not all) of the services that constitute a cloud-computing application to be deployed exclusively for them and operated in a single-tenant setup, while the remaining services can be shared with other tenants or 2) to join a specific multi-tenant deployment of some services for high-availability, disaster-recovery, or regulatory reasons, but share a general common deployment for the others.

This disclosure describes a solution to the described challenges using a mesh assembler that operates on a user demand-specific Assembly Profile to deploy and to connect multi-tenant and single-tenant services as required. Assembly Profiles are generated based on profile templates that are pre-defined by a cloud-computing operator, reflecting previously described scenarios and extended by additional user profiles to further introduce their own (single-tenant) custom extension services.

Figure 1:
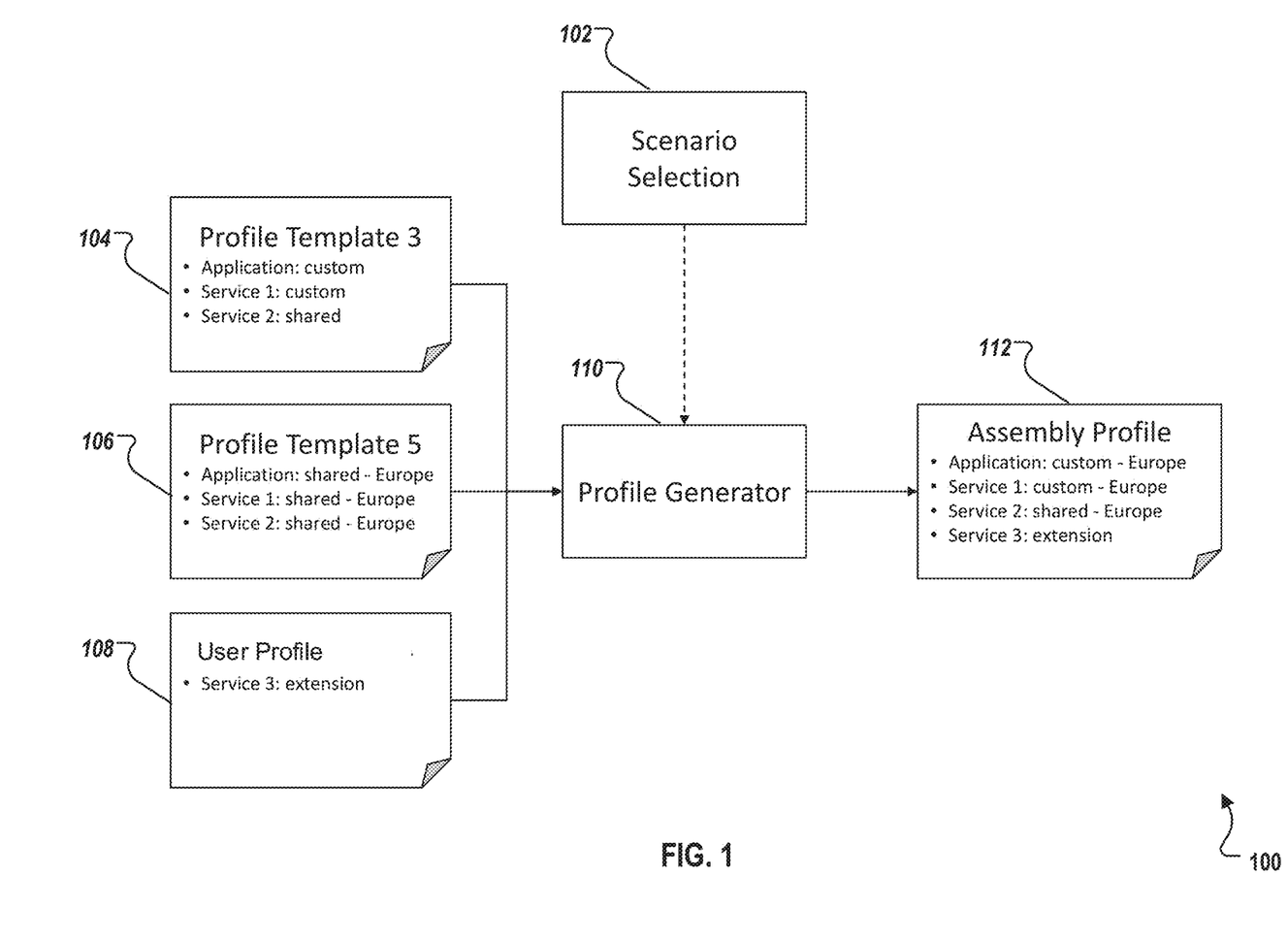
FIG. 1 is a box diagram illustrating an example of a profile generator creating an assembly profile based on templates selected for user demanded scenarios, according to an implementation of the present disclosure.

Turning to FIG. 1, FIG. 1 is a box diagram illustrating an example 100 of a profile generator creating an Assembly Profile based on templates selected for user demanded scenarios, according to an implementation of the present disclosure.

The example in FIG. 1 depicts the generation of an Assembly Profile based on a user Scenario Selection 102 (for example, using a scenario selection user interface (not illustrated) on a computer display device) of two scenarios (here, a scenario 3 and a scenario 5 associated with Profile Template 3 104 and Profile Template 5 106, respectively), enhanced by a user-specific extension service as part of User Profile 108. Other Profile Templates (for example Profile Templates 1, 2, 4, and 6–not illustrated) are not considered as the user did not select the respective scenarios.

Profile Template 3 104 reflects requirements for isolated containers for data in use. Both the listed "Application" and "Service 1" will run in "custom" deployments to prevent data in memory to be shared with other tenants. In example 100, "Service 2" only processes technical data that is not mission critical, therefore "Service 2" can still be shared.

In example 100, Profile Template 5 108 reflects a regulatory requirement that all applications and services (here, "Application," "Service 1," and "Service 2") must by physically deployed in "Europe" and can be "shared" For the associated scenario 5, it is not needed to have custom deployments, as long as they run in Europe.

In example 100, the user also wants to add an "extension" service (here, "Service 3"), for which the User Profile 108 is created. User profile 108 only contains "Service 3," which is a custom (that is, "extension") service as it is user-specific and not shared with other tenants.

The Profile Generator 110 combines requirements of all input Profile Templates and User Profiles. If for any application or service a custom deployment is required, this requirement takes precedence over shared deployments. Furthermore, additional attributes (for example, the requirement of a deployment in Europe) are carried over to a final Assembly Profile 112.

In other words, in some implementations, precedence rules are: 1) user profile always wins; 2) custom deployment wins over shared deployment; and 3) all attributes (which each specifies an additional requirement) are merged.

In some implementations, an example generation process for each application and service item can resemble:
1. Application: custom+Application: shared−Europe-→Application custom:−Europe
2. Service 1: custom+Service 1: shared−Europe→Service 1: custom−Europe
3. Service 2: shared+Service 2: shared−Europe→Service 2: shared−Europe
4. Service 3: extension→Service 3: extension.

In some implementations, other possible generation processes for each application and service are envisioned as will be understood by one of ordinary skill in the art and consistent with this disclosure.

In example 100, as "Service 3" in User profile 108 is an "extension" service deployed by the user, it is the user's responsibility to deploy it in Europe and to register the service into a cloud-computing based Landscape Directory (refer to FIG. 2, 206) with its deployment coordinates. All other services are managed by the cloud provider.

The final Assembly Profile 112 is then input into a Mesh Assembler (refer to FIG. 2, 202) that deploys custom applications and services and configures the routing between all components as needed.

Figure 2:
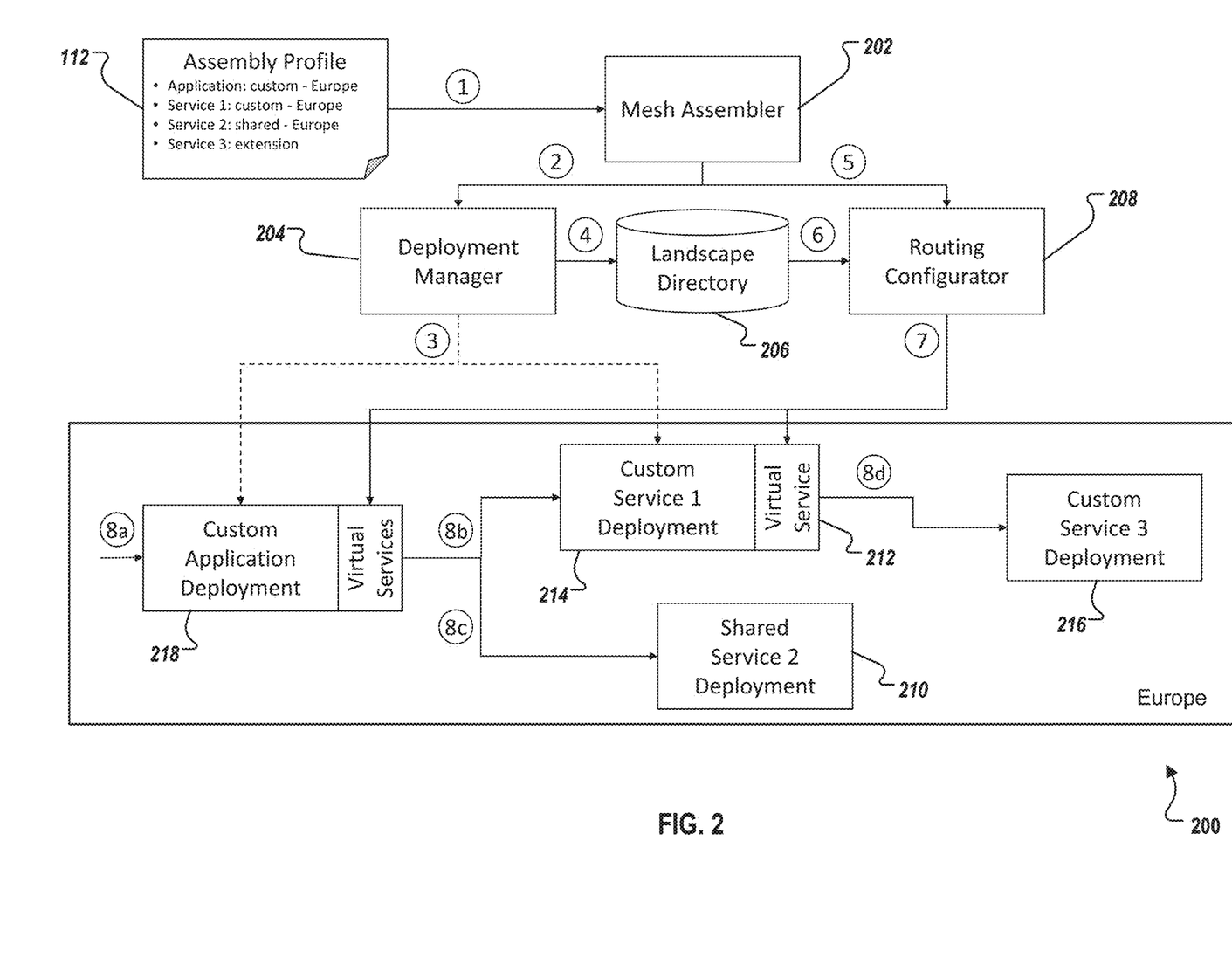
FIG. 2 is a block diagram of an example method for a Mesh Assembler coordinating service deployments and routing configurations on demand, according to an implementation of this disclosure.

Turning to FIG. 2, FIG. 2 is a block diagram of an example method 200 for a Mesh Assembler coordinating service deployments and routing configurations on demand, according to an implementation of this disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At (1), a user requests a new cloud-computing application tenant according to the generated Assembly Profile 112 (of FIG. 1) defining which applications and services can be shared with others (if a specific shared deployment is to be selected, providing certain capabilities—such as, high-availability, disaster-recovery, and regulatory restrictions), and which will be deployed exclusively for this tenant.

From (1), method 200 proceeds to (2).

At (2), a Mesh Assembler 202 calls a Deployment Manager 204 for all applications and services that need to be custom deployed according to the requested Assembly Profile 112. The Deployment Manager is capable of on-demand deploying and running a service to a specific infrastructure as requested to create a new service instance that can then be integrated in a service mesh and provide its service to other applications or services.

From (2), method 200 proceeds to (3).

At (3), the Deployment Manager 204 executes a deployment of the requested "custom" "Application" and "Service 1." The additional requirement to deploy to a datacenter in Europe is considered here. Note that Service 3 in the Assembly Profile 112 is an extension, which could be deployed anywhere, even outside of Europe as specified for the Application and Service 1/Service 2. Since extension services are the responsibility of the user, the user deploys and operates them on their own, so they do not need to obey any rules. This is also the reason why there are no attributes listed for extension services—that is, if it is an extension service, then all checks end here. Only for provided services do attributes (such as, Europe) exist to choose from.

From (3), method 200 proceeds to (4).

At (4), the Deployment Manager 204 records deployment coordinates (for example, hostname and credentials) in a Landscape Directory 206, which relates created deployments to the new tenant and the user using it. The Landscape Directory 206 lists all services across infrastructures with their names, types, properties, and deployment coordinates (for example, URL and credentials). The Landscape Directory 206 also allows the Routing Configurator 208 to look up services with certain attributes and to configure them into a service mesh.

From (4), method 200 proceeds to (5).

At (5), the Mesh Assembler 202 calls a Routing Configurator 208, used to set up the service mesh for communication between applications and all services (custom, shared, and extension). The Routing Configurator 208 configures the actual endpoint that gets invoked and the credentials to use when a component within a service mesh calls a service by its symbolic name.

From (5), method 200 proceeds to (6).

At (6), the Routing Configurator 208 reads deployment coordinates for all applications and services of the requested Assembly Profile 112 from the Landscape Directory 206, including shared deployments (here, Service 2 210), the tenant-specific deployments created in (3) ("Application" and "Service 1") as well as the user-provided extension service ("Service 3"). As the additional requirement of a "Europe" deployment for shared deployments is requested in the Assembly Profile 112, this attribute is used as a filter when selecting a matching shared deployment of Service 2 210 from the Landscape Directory 206.

From (6), method 200 proceeds to (7).

At (7), the Routing Configurator 208 configures the service mesh to route requests for the new user tenant to those deployments that were identified in (6). This might be done by defining a subset in a Virtual Service (for example, Virtual Service 212 associated with Custom Service 1 Deployment 214) for each deployment and creating a routing rule to direct traffic for this tenant to the respective destination (for example, Service 3 associated with the Custom Service 3 Deployment 216).

From (7), method 200 proceeds to (8a)-(8d).

At 8(a), at runtime, requests are received by the Application associated with the Custom Application Deployment 218 that calls Service 1 associated with the Custom Service 1 Deployment 214 at (8b) and Service 2 associated with Shared Service Deployment 210 at (8c), where Service 1 subsequently calls Service 3 associated with the Custom Service 3 Deployment 216 at (8d).

Note that, in some implementations, these calls are not explicitly directed at the deployments, and only the tenant information is included in the call (for example, as a header or in a target URL), with the configured service mesh taking care of routing requests to either shared (multi-tenant) or custom (single-tenant) deployments. Note that while the Deployment Manager 204 does not need to trigger deployment of the extension service (Service 3, which must be deployed by the user on their own), it nevertheless uses Service 3's deployment coordinates in the Landscape Directory 206, enabling the Routing Configurator 208 to include the Service 3 in the mesh topology like any other service.

After (8*d*), method 200 can stop.

Figure 3:
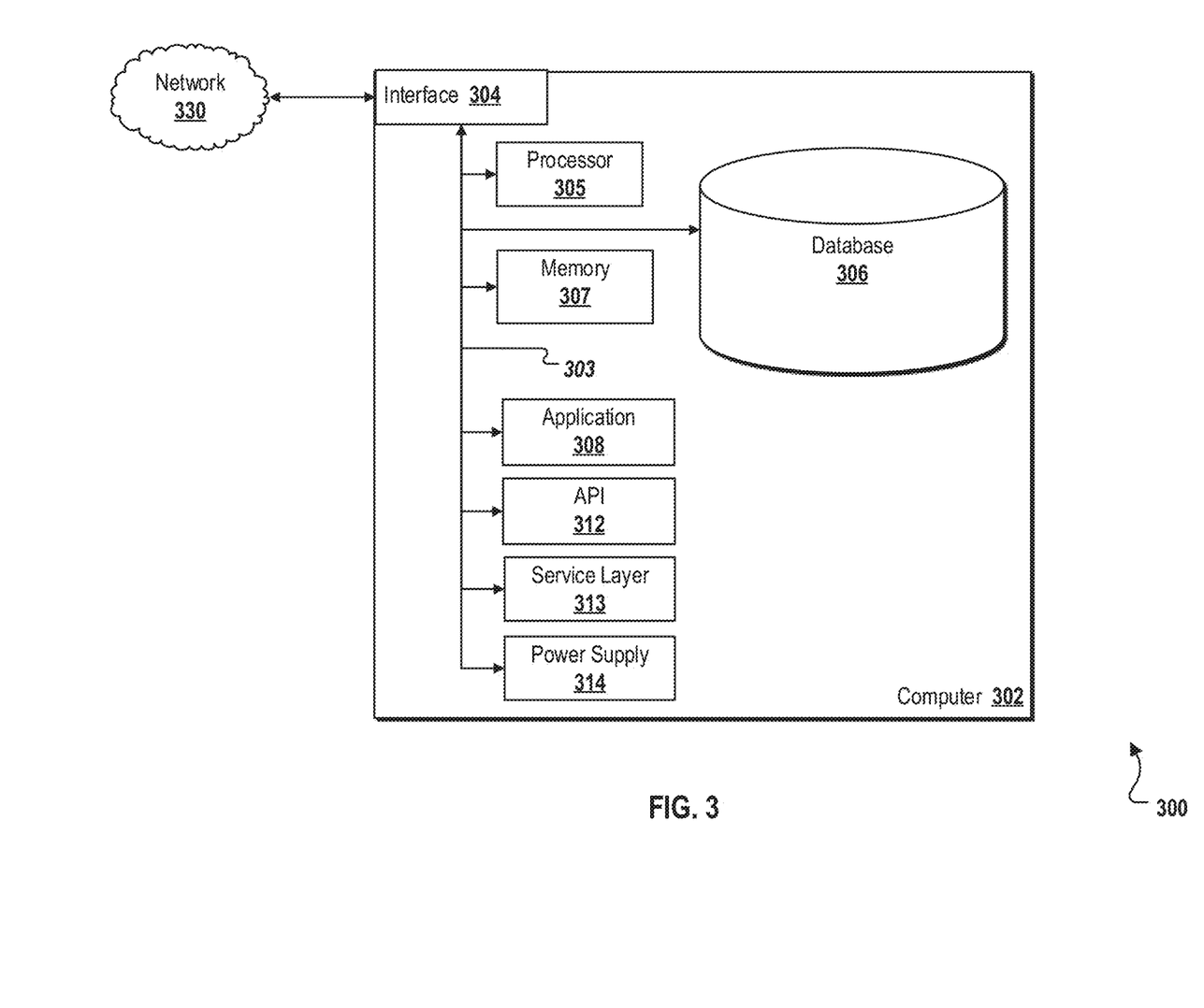
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. The Database 306 can hold and operate on at least any data type mentioned or any data type consistent with this disclosure.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: receiving, at a mesh assembler, a request for a new cloud-computing application tenant, wherein the request includes an assembly profile; calling, by the mesh assembler, a deployment manager for applications and services that need to be custom deployed according to the assembly profile; and calling, by the mesh assembler, a routing configurator, which looks up services with certain attributes and configures services with certain attributes into a service mesh.

The foregoing and other described implementations can each, optionally, include one or more of the following features:

A first feature, combinable with any of the following features, wherein the assembly profile defines which applications and services will be deployed exclusively for the new cloud-computing application tenant and which can be shared with other tenants.

A second feature, combinable with any of the previous or following features, wherein the deployment manager performs on-demand deployment and running a service to a specific infrastructure to create a new service instance for integration into the service mesh and for providing its service to other applications or services.

A third feature, combinable with any of the previous or following features, comprising executing, by the deployment manager, a deployment of the applications and services that need to be custom deployed.

A fourth feature, combinable with any of the previous or following features, comprising recording, by the deployment manager, coordinates in a landscape directory, wherein the coordinates relate the deployment to the new cloud-computing application tenant.

A fifth feature, combinable with any of the previous or following features, comprising reading, by the routing configurator and as deployments, deployment coordinates for all applications and services of the assembly profile from the landscape directory.

A sixth feature, combinable with any of the previous or following features, comprising configuring, by the routing configurator, the service mesh, wherein the configuration permits the service mesh to route requests for the new cloud-computing application tenant to the deployments.

In a second implementation, a non-transitory, computer-readable medium storing one or more instructions executable by a computer system to perform operations, comprising: receiving, at a mesh assembler, a request for a new cloud-computing application tenant, wherein the request includes an assembly profile; calling, by the mesh assembler, a deployment manager for applications and services that need to be custom deployed according to the assembly profile; and calling, by the mesh assembler, a routing configurator, which looks up services with certain attributes and configures services with certain attributes into a service mesh.

The foregoing and other described implementations can each, optionally, include one or more of the following features:

A first feature, combinable with any of the following features, wherein the assembly profile defines which applications and services will be deployed exclusively for the new cloud-computing application tenant and which can be shared with other tenants.

A second feature, combinable with any of the previous or following features, wherein the deployment manager performs on-demand deployment and running a service to a specific infrastructure to create a new service instance for integration into the service mesh and for providing its service to other applications or services.

A third feature, combinable with any of the previous or following features, comprising executing, by the deployment manager, a deployment of the applications and services that need to be custom deployed.

A fourth feature, combinable with any of the previous or following features, comprising recording, by the deployment manager, coordinates in a landscape directory, wherein the coordinates relate the deployment to the new cloud-computing application tenant.

A fifth feature, combinable with any of the previous or following features, comprising reading, by the routing configurator and as deployments, deployment coordinates for all applications and services of the assembly profile from the landscape directory.

A sixth feature, combinable with any of the previous or following features, comprising configuring, by the routing configurator, the service mesh, wherein the configuration permits the service mesh to route requests for the new cloud-computing application tenant to the deployments.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: receiving, at a mesh assembler, a request for a new cloud-computing application tenant, wherein the request includes an assembly profile; calling, by the mesh assembler, a deployment manager for applications and services that need to be custom deployed according to the assembly profile; and calling, by the mesh assembler, a routing configurator, which looks up services with certain attributes and configures services with certain attributes into a service mesh.

The foregoing and other described implementations can each, optionally, include one or more of the following features:

A first feature, combinable with any of the following features, wherein the assembly profile defines which applications and services will be deployed exclusively for the new cloud-computing application tenant and which can be shared with other tenants.

A second feature, combinable with any of the previous or following features, wherein the deployment manager performs on-demand deployment and running a service to a specific infrastructure to create a new service instance for integration into the service mesh and for providing its service to other applications or services.

A third feature, combinable with any of the previous or following features, comprising executing, by the deployment manager, a deployment of the applications and services that need to be custom deployed.

A fourth feature, combinable with any of the previous or following features, comprising recording, by the deployment manager, coordinates in a landscape directory, wherein the coordinates relate the deployment to the new cloud-computing application tenant.

A fifth feature, combinable with any of the previous or following features, comprising reading, by the routing configurator and as deployments, deployment coordinates for all applications and services of the assembly profile from the landscape directory.

A sixth feature, combinable with any of the previous or following features, comprising configuring, by the routing configurator, the service mesh, wherein the configuration permits the service mesh to route requests for the new cloud-computing application tenant to the deployments.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, at a mesh assembler, a request for a new cloud-computing application tenant, wherein the request includes an assembly profile;
   calling, by the mesh assembler, a deployment manager for applications and services that need to be custom deployed according to the assembly profile; and
   calling, by the mesh assembler, a routing configurator, wherein the routing configurator looks up services with certain attributes, wherein the services with certain attributes are non-extension services, wherein the routing configurator configures the services with certain attributes and extension services into a service mesh, and wherein the routing configurator configures an invoked endpoint and credentials used when a component in the service mesh calls a service using a symbolic name.

2. The computer-implemented method of claim 1, wherein the assembly profile defines which applications and services will be deployed exclusively for the new cloud-computing application tenant and which can be shared with other tenants, and wherein extension services lack attributes in the assembly profile.

3. The computer-implemented method of claim 1, wherein the deployment manager performs on-demand deployment and running a service to a specific infrastructure to create a new service instance for integration into the service mesh and for providing its service to other applications or services.

4. The computer-implemented method of claim 1, comprising executing, by the deployment manager, a deployment of the applications and services that need to be custom deployed.

5. The computer-implemented method of claim 4, comprising recording, by the deployment manager, coordinates in a landscape directory, wherein the coordinates relate the deployment to the new cloud-computing application tenant.

6. The computer-implemented method of claim 5, comprising reading, by the routing configurator and as deployments, deployment coordinates for all applications and services of the assembly profile from the landscape directory.

7. The computer-implemented method of claim 6, comprising configuring, by the routing configurator, the service mesh, wherein the configuration permits the service mesh to route requests for the new cloud-computing application tenant to the deployments.

8. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations, comprising:
   receiving, at a mesh assembler, a request for a new cloud-computing application tenant, wherein the request includes an assembly profile;
   calling, by the mesh assembler, a deployment manager for applications and services that need to be custom deployed according to the assembly profile; and
   calling, by the mesh assembler, a routing configurator, wherein the routing configurator looks up services with certain attributes, wherein the services with certain attributes are non-extension services, wherein the routing configurator configures the services with certain attributes and extension services into a service mesh, and wherein the routing configurator configures an invoked endpoint and credentials used when a component in the service mesh calls a service using a symbolic name.

9. The computer-implemented system of claim 8, wherein the assembly profile defines which applications and services will be deployed exclusively for the new cloud-computing application tenant and which can be shared with other tenants, and wherein extension services lack attributes in the assembly profile.

10. The computer-implemented system of claim 8, wherein the deployment manager performs on-demand deployment and running a service to a specific infrastructure to create a new service instance for integration into the service mesh and for providing its service to other applications or services.

11. The computer-implemented system of claim 8, comprising executing, by the deployment manager, a deployment of the applications and services that need to be custom deployed.

12. The computer-implemented system of claim 11, comprising recording, by the deployment manager, coordinates in a landscape directory, wherein the coordinates relate the deployment to the new cloud-computing application tenant.

13. The computer-implemented system of claim 12, comprising reading, by the routing configurator and as deployments, deployment coordinates for all applications and services of the assembly profile from the landscape directory.

14. A non-transitory, computer-readable medium storing one or more instructions executable by a computer system to perform operations, comprising:
   receiving, at a mesh assembler, a request for a new cloud-computing application tenant, wherein the request includes an assembly profile;
   calling, by the mesh assembler, a deployment manager for applications and services that need to be custom deployed according to the assembly profile; and
   calling, by the mesh assembler, a routing configurator, wherein the routing configurator looks up services with certain attributes, wherein the services with certain attributes are non-extension services, wherein the routing configurator configures the services with certain attributes and extension services into a service mesh, and wherein the routing configurator configures an invoked endpoint and credentials used when a component in the service mesh calls a service using a symbolic name.

15. The non-transitory, computer-readable medium of claim 14, wherein the assembly profile defines which applications and services will be deployed exclusively for the new cloud-computing application tenant and which can be shared with other tenants, and wherein extension services lack attributes in the assembly profile.

16. The non-transitory, computer-readable medium of claim 14, wherein the deployment manager performs on-demand deployment and running a service to a specific infrastructure to create a new service instance for integration into the service mesh and for providing its service to other applications or services.

17. The non-transitory, computer-readable medium of claim 14, comprising executing, by the deployment manager, a deployment of the applications and services that need to be custom deployed.

18. The non-transitory, computer-readable medium of claim 17, comprising recording, by the deployment manager, coordinates in a landscape directory, wherein the coordinates relate the deployment to the new cloud-computing application tenant.

19. The non-transitory, computer-readable medium of claim 18, comprising reading, by the routing configurator and as deployments, deployment coordinates for all applications and services of the assembly profile from the landscape directory.

20. The non-transitory, computer-readable medium of claim 19, comprising configuring, by the routing configurator, the service mesh, wherein the configuration permits the service mesh to route requests for the new cloud-computing application tenant to the deployments.

\* \* \* \* \*